US006507584B1

(12) United States Patent
Moriwaki et al.

(10) Patent No.: US 6,507,584 B1
(45) Date of Patent: Jan. 14, 2003

(54) ATM SWITCH

(75) Inventors: Norihiko Moriwaki, Kokubunji (JP); Takahiko Kozaki, Tokyo (JP); Takaaki Toyama, Fujisawa (JP); Mitsuhiro Wada, Yokohama (JP); Yozo Oguri, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/193,414

(22) Filed: Nov. 18, 1998

(30) Foreign Application Priority Data

Nov. 20, 1997 (JP) .............................. 9-319328

(51) Int. Cl.[7] .............................. H04L 12/28

(52) U.S. Cl. ..................................... 370/398

(58) Field of Search .................. 370/399, 354, 370/400, 398, 396, 413, 367, 387, 474

(56) References Cited

U.S. PATENT DOCUMENTS

| 4,999,835 A | 3/1991 | Lagoutte ................... 370/94.1 |
| 5,062,106 A | 10/1991 | Yamazaki et al. ........... 370/94.1 |
| 5,091,903 A | * 2/1992 | Schrodi ...................... 370/388 |

(List continued on next page.)

FOREIGN PATENT DOCUMENTS

| EP | 108655 | 5/1984 | |
| JP | 1-204548 | 8/1989 | |
| JP | 2-1669 | 1/1990 | |
| JP | 2-2767 | 1/1990 | |
| JP | 2-67045 | 3/1990 | |
| JP | 4-98937 | 3/1992 | |
| JP | 5-145574 | 6/1993 | |
| WO | 88/07298 | 9/1988 | ........... H04L/11/20 |

OTHER PUBLICATIONS

R. Awdeh et al "Survey of ATM Switch Architecture" Computer Networks and ISDN Systems, vol. 27, No. 12, Nov. 1, 1995, pp. 1567–1613.
Kitawaki et al, "Speach Coding Technology for ATM Network" IEEE 1990, pp. 21–27.
Proceedings of 1990 Spring Convention of IEICE of Japan, B–443 (Mar. 18, 1990) p. 3–21.

(List continued on next page.)

*Primary Examiner*—Wellington Chin
*Assistant Examiner*—William Schultz
(74) *Attorney, Agent, or Firm*—Antonelli, Terry, Stout & Kraus, LLP

(57) ABSTRACT

An ATM switch that can be expanded to form a large scale ATM switch with minimal hardware additions. The ATM switch includes a plurality of ATM switch units arranged in parallel, a plurality of cell distributors arranged on the input side of the ATM switch units, and a plurality of cell assemblers arranged on the output side of the ATM switch units. Each of the cell distributors distributes ATM cells received from a plurality of incoming highways to a buffer memory having a plurality of queues corresponding to the output ports of the ATM switch units, namely destinations of the ATM cells, and stores the ATM cells to the queues in the buffer memory. Each cell distributor reads ATM cells having the same destination information, and outputs such ATM cells to respective ones of the ATM switch units in parallel. Each of the ATM switch units independently exchanges the received ATM cell in parallel with the other ATM switch units. Each of the cell assemblers multiplexes ATM cells received from the ATM switch units in a manner to preserve the time sequential order of the ATM cells, and outputs the ATM cells to one of a plurality of outgoing highways. A desired increase in the capacity of the ATM switch is implemented by adding an ATM switch unit between the cell distributors and the cell assemblers, thereby allowing for an increase in hardware in proportion to the desired increase in capacity.

2 Claims, 11 Drawing Sheets

U.S. PATENT DOCUMENTS

| | | | |
|---|---|---|---|
| 5,097,466 A | 3/1992 | Kammerl | 370/94.1 |
| 5,119,369 A | 6/1992 | Tanabe et al. | 370/60 |
| 5,136,584 A | 8/1992 | Hedlund | 370/94.1 |
| 5,140,588 A | 8/1992 | Danner | 370/60 |
| 5,144,297 A | 9/1992 | Ohara | 370/60 |
| 5,157,654 A | 10/1992 | Cisneros | |
| 5,166,926 A | 11/1992 | Cisneros et al. | 370/60 |
| 5,191,577 A | 3/1993 | Vchida et al. | 370/60 |
| 5,199,027 A | 3/1993 | Barri | 370/60 |
| 5,202,885 A | 4/1993 | Schrodi et al. | 370/94.1 |
| RE34,305 E | 7/1993 | Sakurai et al. | 370/60 |
| 5,228,028 A | 7/1993 | Cucchi et al. | 370/94.1 |
| 5,230,002 A | 7/1993 | Yamashita et al. | 371/37.1 |
| 5,249,178 A | 9/1993 | Kurano et al. | 370/60 |
| 5,287,358 A * | 2/1994 | Nakayama | 370/392 |
| 5,343,468 A | 8/1994 | Rau | |
| 5,461,626 A | 10/1995 | Takase et al. | 370/389 |
| 5,557,621 A | 9/1996 | Nakano et al. | 370/94.1 |
| 5,608,719 A * | 3/1997 | Hyodo et al. | 370/250 |
| 5,787,086 A * | 7/1998 | McClure et al. | 370/413 |
| 5,790,522 A * | 8/1998 | Fichou et al. | 370/236 |
| 5,822,321 A * | 10/1998 | Peterson et al. | 370/474 |

OTHER PUBLICATIONS

International Switching Symposium, 1990, "Integrating Video Codecs in ATM Networks", B. Veoten, et al., vol. 6, Jun. 1990, New York, U.S.

IBM Technical Disclosure Bulletin, "Adaptive High–speed CRC Generator/Checker", vol. 32, No. 8B, Jan. 1990, New York, U.S.

Configurating of ATM Switching Networks which are Non–blocking at Call Level by K. Sezaki, et al, pp. 32–39.

* cited by examiner

ATM SWITCH

BACKGROUND OF THE INVENTION

The present invention relates to an ATM (Asynchronous Transfer Mode) switch that exchanges ATM cells. More particularly, the present invention relates to a large scale ATM switch that can be expanded with hardware in proportion to increase in capacity, wherein the expanded ATM switch does not internally block traffic flow.

Various structures for large scale ATM switches have been proposed. Such large scale ATM switches are intended to increase the speed and permit the implementation of a large scale ATM communications in a communication network. An example of a large scare ATM switch is described in Japanese patent Laid-open Publication 4-98937 corresponding to U.S. Pat. No. 5,557,621. The large scale ATM switch described therein is a cell division type ATM switch. A cell division type ATM switch divides an ATM cell into a plurality of partial cells, and exchanges the partial cells with a plurality of ATM switch units. Each of the ATM switch units are independently operated and can properly be used to increase the capacity of an ATM switch.

However, in the cell division type ATM switch described above, it is necessary to add the same header to all of the partial cells. If there are a large number of partial cells throughput of the ATM switch decreases due to the fact that the portion of each partial cell occupied by the header increases. Further, if the size of a cell is fixed, a limit arises in the number of cell partitions that can be performed. In other words, when a fixed-length cell is used, increases in capacity of an ATM switch is limited when the switch is a cell division type ATM switch.

Another cell division type ATM switch is described in Japanese patent Laid-open Publication 2-67045. This switch slices a cell into a plurality of signals, and exchanges the signals with a plurality of subswitches. In this type of ATM switch, a limit arises in bit-slicing a cell similar to the cell-division type ATM switch disclosed in 4-98937. Thus, a limit also arises in the capacity of the ATM switch disclosed in 2-67045.

FIG. 2 illustrates a known structure of a large scale ATM switch. This switch connects a plurality of ATM switch units, which have predetermined exchange abilities to form an ATM switch matrix. In this switch the blocking of traffic does not occur in spite of the large scale nature of the switch. Further, this switch can be easily expanded to provide even larger capacity. However, a disadvantage of the ATM switch matrix is that desired increases in capacity requires increasingly larger amount of hardware to accomplish the increases. Therefore, this switch is not suitable for use in an exchange system wherein size considerations are important.

Another large scale ATM switch is described in an article "Configuration of ATM Switching Networks which are Non-blocking at Call Level" by Sesaki et al., The Transaction of the Institute of Electronics, Information and Communication Engineers, B-I, J76-B-B, No. 1, pp. 32–39 (January 1993). This switch provides a large scale ATM switch by connecting ATM switches in parallel as illustrated in FIG. 3. The switch provides increased capacity by use of the following structure:

(1) A plurality of multiplexers (MUX) 11 and a plurality of demultiplexers (DMUX) 12 are arranged in parallel on the input side of a plurality of ATM switches 10 are also arranged in parallel;

(2) A plurality of multiplexers (MUX) 13 and a plurality of demultiplexers (DMUX) 14 are arranged in parallel on the output side of the ATM switches 10; and (3) The ATM switches 10 share traffic load on the cell level or connection level, and exchange cells.

The matrix ATM switch illustrated in FIG. 2 provides advantages in that even when the switch is expanded an internal blocking of traffic does not occur in. However, the disadvantage is that when the switch is expanded K times the capacity of a single ATM switch unit, the number of ATM switch units required is $4K^2$. For example, when the capacity of the matrix ATM switch is doubled, 16 ATM switch units are required. Thus, a proportionately larger quantity of ATM switch units are required for each unit increase of capacity of the matrix ATM switch.

In the ATM switch illustrated in FIG. 3, if load sharing of traffic is performed at random according to the cell level, there is a possibility of the occurrence of reversing the sequential order of the cells. Thus, to properly reconstruct the cell order a time stamp is necessary on the output side of the switch. Implementation of an ATM switch using a time stamp requires the addition of hardware and complex control thereof. Further, if load sharing of traffic is performed according to the connection level, internally a blocking of traffic in the ATM switch occurs. To remove the blocking of traffic the number of ATM switches installed in parallel is increased or the internal link speed is increased to a level higher than that of the input/output line speed. Thus, similar to the above, the addition of redundant hardware becomes necessary.

Therefore, according to the above, a desired increase in the capacity of a conventional large scale ATM switch is accomplished by increasing the number of ATM switch units. However, the increase in capacity is accomplished by a proportionally larger increase in hardware. In numerous application size is an important consideration, thereby limiting large increases in hardware. However, limiting increases in hardware increases the possibility that blocking of traffic may occur.

SUMMARY OF THE INVENTION

An object of the present invention is to provide an ATM switch that can easily be expanded with just minimal hardware additions.

Another object of the present invention is to provide an ATM switch that can be easily expanded by connecting small capacity ATM switch units in parallel to form a large scale ATM switch.

Yet another object of the present invention is to provide a large scale ATM switch having a plurality of ATM switch units connected in parallel, wherein internal blocking of traffic does not occur.

Still yet another object of the present invention is to provide an ATM switch that adds minimal hardware for each unit increase in capacity.

The present invention provides a method of expanding the capacity of an ATM switch suitable for constructing a large scale ATM switch. Specifically, the present invention provides the following for expanding the capacity of an ATM switch. Providing a small capacity ATM switch unit. Connecting others of such ATM switch units in parallel to increase the capacity of the ATM switch to form a large scale ATM switch. The large scale ATM switch expanded in the manner described above does not require an additional new control circuit and a control procedure thereof. The expansion procedure is simple being that it can be accomplished by the addition of minimal hardware. Further, the internal blocking of traffic in the ATM switch does not occur.

In the present invention an increase in the capacity of an ATM switch can be accomplished easily by small additions of hardware. For example, when doubling the capacity of an ATM switch the quantity of a switch is doubled. Thus, when the capacity is increased 4 times, the quantity of the hardware of the switch is increased 4 times. Therefore, in the present invention the expansion of the capacity of an ATM switch is essentially proportional to an increase in the quantity of the hardware added to the ATM switch to accomplish the desired increase.

The present invention also provides control methods for an ATM switch, such as a cell distribution method for an expanded switch, a cell assembling method for each of the switches, and a cell control method for the entire switch. These control methods prevent internal blocking of traffic in the ATM switch even if the capacity of the ATM switch is increased.

The ATM switch of the present invention can easily perform cell distribution and assembling without the need for complex control even when the capacity of the switch is increased. To accomplish this, the present invention provides an ATM switch which exchanges ATM cells received from a plurality of input highways to one of a plurality of output highways based on destination information included in the header of each of the ATM cells. The ATM switch includes a plurality of ATM switch units that exchange the ATM cells, a plurality of cell distributors that distribute the ATM cells received from the input highways to the ATM switch units based on routing information of a header of each of the ATM cells, and a plurality of cell assemblers that assemble the ATM cells exchanged with the ATM switch units and output the ATM cells to one of the output highways based on the destination information of the header of each of the ATM cells. The ATM switch inputs a plurality of cells for the same output line from each of the cell distributors into input lines of each of the ATM switch units in parallel. Each of the ATM switch units performs the same exchange operation independently.

Each of cell distributors includes a buffer memory which accumulates ATM cells received from the input highways, a distributor which distributes the ATM cells read from the buffer memory to an input line of each ATM switch unit, and a control unit which controls the writing and reading of the buffer memory.

Each of the cell assemblers includes a buffer memory that accumulates the ATM cells received from an output line of each of ATM switch units, a demultiplexer that outputs a cell read from the buffer memory to one of the output highways, and a control unit that controls the writing and reading of the buffer memory.

Each cell distributor operates as follows:
(1) A cell received from a plurality of input highways is accumulated in a queue, which is constructed in the buffer memory, corresponding to the output line of ATM switch unit;
(2) A plurality of ATM cells destined for the same output line of an ATM switch unit are read from the queue; and
(3) A plurality of ATM cells destined for the same output line are dispersively input into the same input line of each ATM switch unit in parallel. Each of the ATM switch units perform the same exchange operation independently.

Each cell assembler assembles ATM cells from the output lines of the ATM switch unit each of which as described above performs the same exchange operation. Each ATM cell is output to the output highway which is the destination of the ATM cell.

Each cell distributor of the ATM switch of the present invention includes a dummy cell generator that generates a dummy cell having the same destination information as normal cells which are output to the ATM switch units in parallel. Use of the dummy cell generator permits each of the ATM switch units to perform the same exchange operation independently. Such is possible even if the ATM cells for the same output line from each of the cell distributors are input into the same input line of each of the ATM switch units in parallel and respectively.

When the number of ATM cells, each of which includes the same destination information, output to the ATM switch units in parallel is less than the number of ATM switch units, then the dummy cell generator generates dummy cells each with the same destination information as the ATM cells and sends the dummy cells to ATM switch units. The destination information of the ATM cells, each of which is input into each of ATM switch units, is made the same by this operation. Each cell assembler includes a circuit which detects and discards the dummy cell received from the ATM switch units.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE PREFERRED EMBODIMENTS

The preferred embodiments of an ATM switch according to the present invention is explained by using the drawings. A structure of an ATM switch according to the present invention, the operation thereof and a method of expanding the capacity of the ATM switch, are explained by using the drawings.

Figure 1:
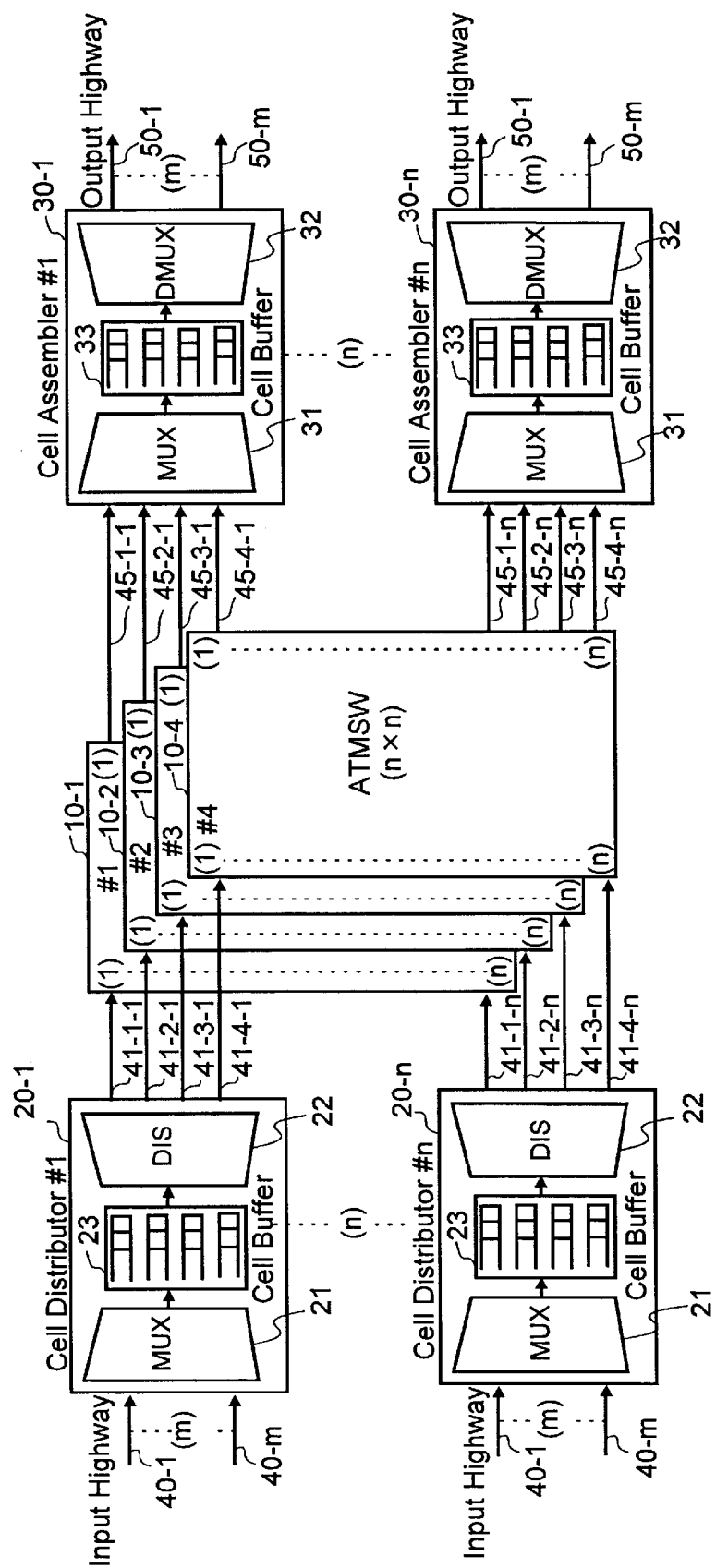
FIG. 1 is a block diagram illustrating the structure of an ATM switch of the present invention.

The construction of the ATM switch in which its switching capacity is expanded to 4 times (4N×4N) the capacity of a ATM switch unit having a predetermined switching capacity of (N×N) is explained as an example. The invention is not limited to the example disclosed. The invention allows for the structure of the ATM switch to be expanded any number of times. The example disclosed is merely exemplary. FIG. 1 is a block diagram illustrating the structure of an ATM switch of the present invention. The ATM switch of the present invention includes the following elements:

(1) An ATM switch having a plurality of ATM switch units 10-1~10-4, in the present example 4 ATM switch units, are connected in parallel. Each ATM switch unit 10-N has a switching capacity of N×N. In each ATM switch unit no internal blocking of traffic flow occurs;

(2) N cell distributors 20-1~20-N, each of which receives ATM cells from M input highways 40-1~40-M and distributes the cells to ATM switch units 10-1~10-4 through 4 of the same input ports (1-N) of each of the ATM switch units 10-1~10-4, wherein the ATM switch units 10-1~10-4 have a plurality of input lines 41-1-x~41-4-x, x being one of 1~N; and (3) N cell assemblers 30-1~30-N, each of which receives cells exchanged in the ATM switch 10 from one of the output ports (1-N) of each of the ATM switch units 10-1~10-4, wherein the ATM switch units 10-1~10-4 have a plurality of output lines 45-1-x~45-4-x, x being one of 1~N, and outputs the cells to a destination highway which is one of M output highways 50-1~50-M.

In this example, the ATM switch 10 is made from 4 ATM switch units 10-1~10-4. In the present invention, switch capacity of the ATM switch 10 can be expanded freely from N×N to KN×KN (K in this case being a positive integer) without blocking of traffic flow internally in the ATM switch 10.

The detailed structure of the ATM switch of the present invention illustrated in FIG. 1 and an operation thereof are explained in the following. Further, the structure of each ATM switch unit 10-1~10-4 and an operation thereof are explained by using the drawings as follows.

Figure 4:
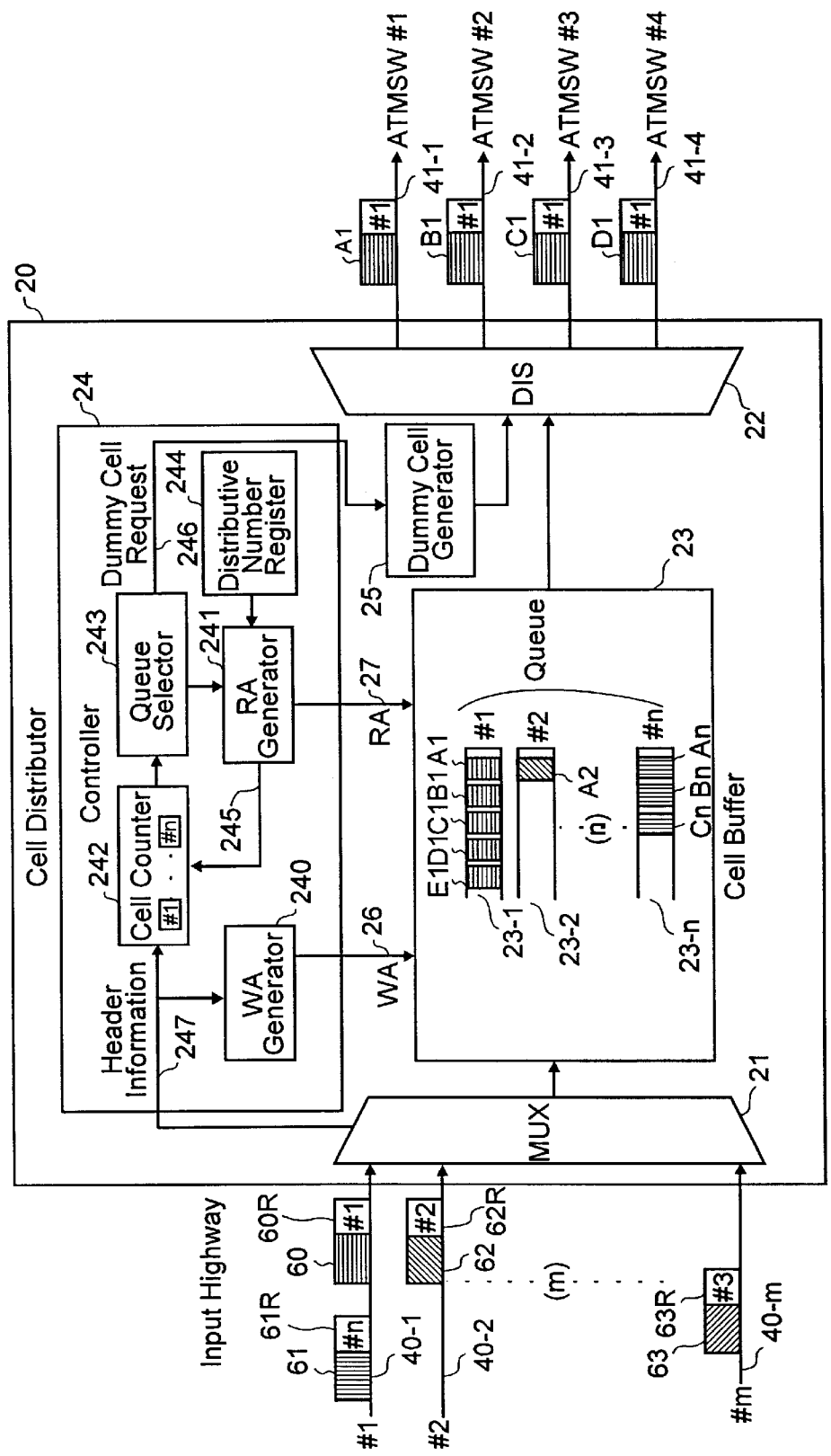
FIG. 4 is a block diagram illustrating the structure and operation of a cell distributor of an ATM switch of the present invention.

FIG. 4 is a block diagram illustrating the structure and operation of each cell distributor 20 of the ATM switch 10 of the present invention. The cell distributor 20 of the present invention is arranged in the input port side of the ATM switch 10. The number N of cell distributors 20 in the ATM switch is the same as the number of input ports of the ATM switch 10. The output of each cell distributor 20 is connected to same input port of each ATM switch unit 10-1 through 10-4, so as to distribute ATM cells, whose destination are the same output port of the ATM switch 10, to each ATM switch unit 10-1~10-4 in parallel.

For example, the 4 output lines 41-1-1~41-4-1 of cell distributor 20-1 are connected to input port 1 of each ATM switch unit 10-1~10-4. A cell having the same destination is provided to each ATM switch unit. When the ATM switch 10 is expanded to increase the capacity of the ATM switch, the expansion is executed as follows:

(1) The number of output lines of the cell distributor 20, i.e., the number of outputs of an internal cell distributor 22 included in the cell distributor 20 is increased corresponding to the number of ATM switch units added;

(2) The number of input lines of the cell assembler 30, i.e., the number of inputs of an internal cell multiplexer 31 included in the cell assembler 30, is increased correspondingly to the number of ATM switch units added; and (3) The output of each cell distributor 20 is connected to the same input port of each ATM switch unit 10-N including the added ATM switch units, and the input of each cell assembler 30 is connected to the same output port of each ATM switch unit 10-N including the added ATM switch units.

Each cell distributor 20 of the present invention, as illustrated in FIG. 4, includes a cell multiplexer (MUX) 21, a cell distributor (DIS) 22, a cell buffer 23 having a plurality of queuing buffers 23-1~23-N, a control unit 24, and a dummy cell generator 25. The control unit 24 includes the following:

(1) A write address (WA) generator 240 and a read address (RA) generator 241 of the cell buffer 23;

(2) A cell counter 242 that counts the number of ATM cells that are accumulated in the cell buffer 23 for every queuing buffer 23-1~23-N that corresponds to the destination of an ATM cell;

(3) A queue selector 243 that selects one of the queuing buffers 23-1~23-N with the maximum number of accumulation cells based on the value of the cell counter 242; and (4) A distributive number register 244 in which the read number of the cell buffer 23 is stored.

The cell distributor 20 operates as follows. The cells received through input highways 40-1~40-M are multiplexed in a cell multiplexer 21. If a memory that constitutes the cell buffer 23 is a multi-port memory, the multiplexer 21 need not be provided. Header information 247 is extracted from the received ATM cell and is input into the control unit 24. In this example, the control unit 24 stores a cell into the cell buffer 23 based on the routing information included in the header of the ATM cell. More particularly, the control unit 24 stores the received ATM cell to one of the queuing buffers 23-1~23-N, each of which corresponds to an output port of the ATM switch 10, based on the routing information included in the header of the ATM cell. The received ATM cell is stored according to a write address (WA) 26 that is output by the WA generator 240. The header information 247 also is input to a cell counter 242 to count the number of cells stored in the queuing buffers 23-1~23-N, each of which corresponds to the output ports of ATM switch. The value of the cell counter 242 for all output ports is input into queue selector 243 so that the queue selector 243 selects one of the output ports having the most ATM cells directed thereto.

To generate the read address (RA) of the cell buffer 23, the output port information selected by the queue selector 243 is input into the RA generator 241. In the RA generator 241, the ATM cell read instructions for the queuing buffers 23-1~23-N are generated based on the number specified from distributive number register 244. More particular, the RA generator 241 generates RA 27 to read ATM cells from one of the queuing-buffers 23-1~23-N that corresponds to an output port based on the output of the queue selector 243. The cell counter 242 is counted down based on the number of ATM cells which are read out from the queuing buffer. In the above example, the number 4, the number of ATM switch units 10-1 through 10-4 that are connected to the cell distributor 20, is previously stored in distributive number register 244 from management equipment of the exchange system (not shown).

The ATM cells read from cell buffer 23 by use of the RA 27 are sequentially allotted to each of the output lines 41-1~41-4 corresponding to the ATM switch units 10-1~10-4 connected to the cell distributor 22. The cell distributor 22 adjusts a timing of output cells, each of which have the same destination information. The number of ATM cells to be output is the same as the number of ATM switch units 10-1~10-4, and the ATM cells are output to each of the output lines 41-1~41-4 in parallel.

Parallel output of the ATM cells having the same destination information from the cell distributor 22 is performed so that the ATM cells having the same destination information are input into the same port of ATM switch units 10-1~10-4 by the same timing. Parallel input of cells into the ATM switch units 10-1~10-4 by the same timing is performed for the following reasons:

(1) Perfect balance of a traffic load between all ATM switch units is enabled;

(2) Cell order in a call level is preserved between all ATM switch units since the same routing operation is executed; and (3) Complex control over the expansion of ATM switch units is not necessary allowing for and self-routing to be performed.

If each of the ATM switch units do not internally block the traffic flow, even if traffic flow is increased with a capacity increase, blocking of traffic flow does not occur internally in the ATM switch of the present invention. This is accomplished since the ATM cells of the same destination are balanced in each ATM switch unit.

FIG. 4 illustrates an example of selecting queuing buffer 23-1 by queue selector 243 in which four (4) cells A1, B1, C1 and D1 are stored. FIG. 4 also illustrates an example of the output of the four (4) cells A1, B1, C1 and D1, to the ATM switch 10 from cell distributor 20 in parallel from the head of stored ATM cells, namely queuing buffer 23-1. When the number of cells stored in the queuing buffer selected by queue selector 243 is fewer than a value stored in the distributive number register 244, the cell distributor 20 operates as follows:

(1) A dummy cell request 246 is transmitted to the dummy cell generator 25 so that queue selector 243 causes generation of dummy cells. The number of dummy cells is based on the difference between the number of counter 242 and the value stored in the register 244; and (2) Cell distributor 20 outputs the dummy cell generated by the dummy cell generator 25, in parallel with the other ATM cells of the same destination.

Figure 5:
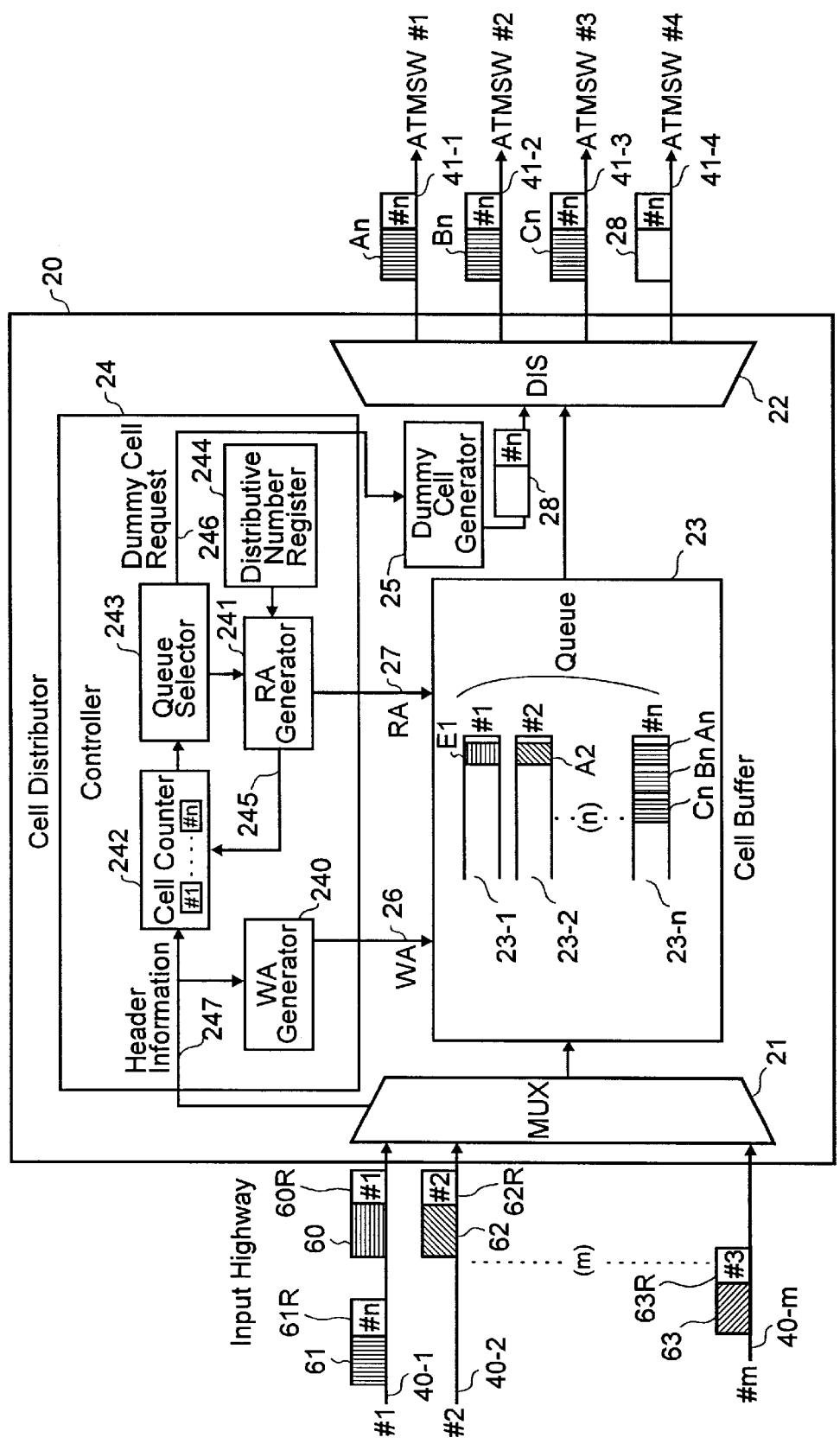
FIG. 5 is a block diagram illustrating another structure and operation of the cell distributor.

The above described operation where a dummy cell is produced is explained by using the drawings. FIG. 5 is an explanation diagram that illustrates another operation of the cell distributor 20. Particularly, FIG. 5 illustrates an operation of cell distributor 20 when the number of stored cells of a queuing buffer 23-N selected by the queue selector 243 is fewer than a value of the distributive number register 244.

In the case of FIG. 5, only 3 cells of AN, BN and CN are stored in queuing buffer 23-N. The queue selector 243 determines that queuing buffer 23-N is the queuing buffer in which a maximum number of cell are stored, and this number is three (3). Thereafter, the queue selector 243 instructs the dummy cell generator 25, by the dummy cell request signal 246, to output 1 dummy cell 28 after the 3 cells have been consecutively read from the queuing buffer 23-N. This dummy cell is output and routed by each ATM switch unit 10-1~10-4 in a manner to preserve the order of the ATM cell.

In the present invention the same routing identifier and user cell identifier as the 3 cells AN, BN and CN, read from the queuing buffer 23-N are given to the header of dummy cell 28. This routing identifier and user cell identifier cause the same routing processing to be performed on cells AN, BN and CN and the dummy cell at the ATM switch 10. The dummy cell is given a dummy cell identifier so that it can be discarded as required in the cell assembler 30 provided at the output side of ATM switch 10. The cell distributor 22 allots cells AN, BN and CN and the dummy cell 28 to each of the ATM switch units 10-1~10-4 in parallel.

When the traffic load in the cell distributor 20 is high, the number of stored cells in the cell distributor 20 is greater than the number of dummy cells generated in the cell distributor 20. Therefore, the dummy cell 28 does not cause a blocking of traffic internally in the ATM switch 10 of the present invention.

Figure 6:
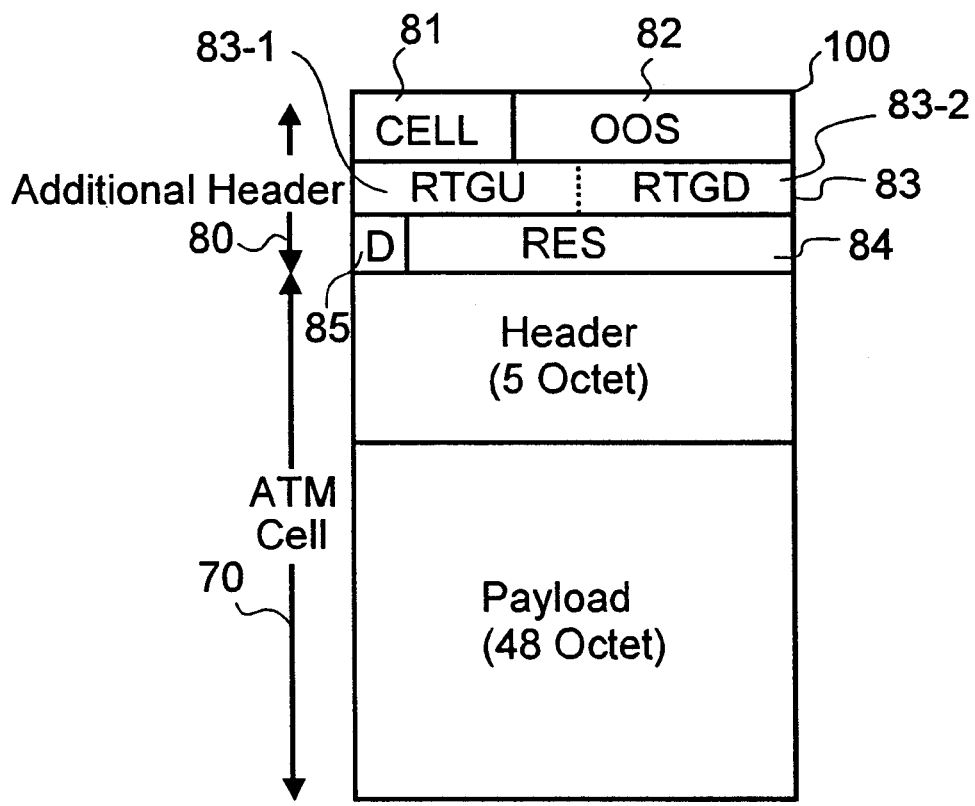
FIG. 6 is a diagram illustrating that structure of an ATM cell of the present invention.

FIG. 6 is a cell structure diagram that illustrates the structure of an ATM cell used in the ATM switch 10 of the present invention. An ATM cell 100 input into the ATM switch 10 includes an ATM cell part 70, having 53 bytes including a cell header having 5 bytes, a cell payload having 48 bytes, and an additional header 80 which is used in a communication system such as the ATM switch 10 of the present invention. The additional header 80 includes a CELL area 81 in which information indicating cell types, such as an idle cell, a user cell and a test cell is stored, a QOS area 82 in which a cell quality of service identifier for identifying a quality control for the cell is stored, RTGU area 83-1 and RTGD area 83-2 in which an output port identifier for identifying an output port of the ATM switch 10 is stored, a D area 85, at least one bit, indicating whether the cell is a dummy cell, and a RES area 84 for reserving space in the ATM cell for storing other as of yet unknown identifiers. With respect to the D area 85 when D=1 a dummy cell is indicated and when D=0 a normal cell as indicated. RTGU area 83-1, which is the upper bits of an outport identifier, is used for routing in the ATM switch 10. RTGD area 83-2, which is the lower bits of the output port identifier, is used for designation of elements in the cell assembler 30.

Figure 7:
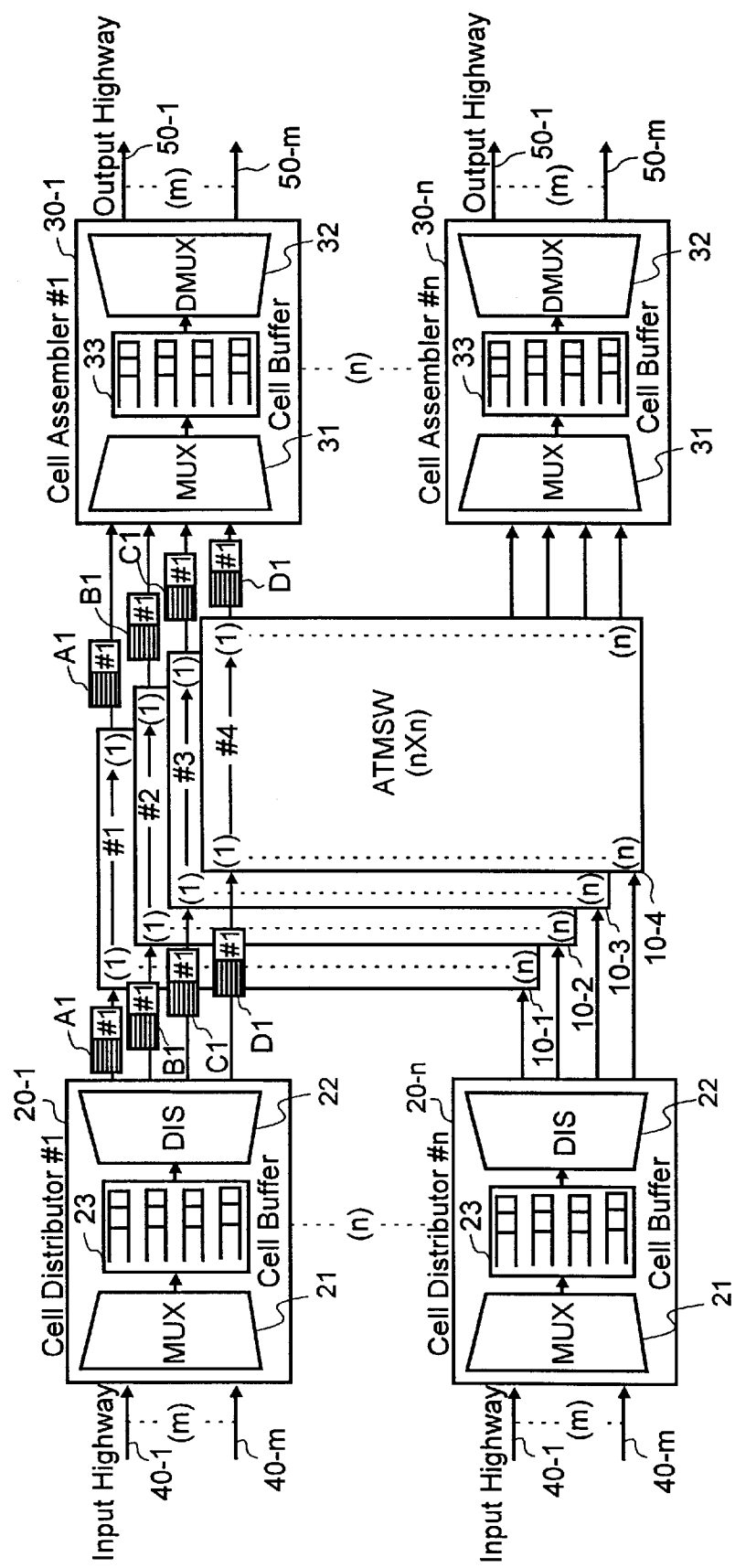
FIG. 7 is a block diagram illustrating the structure and operation of an ATM switch of the present invention.
Figure 8:
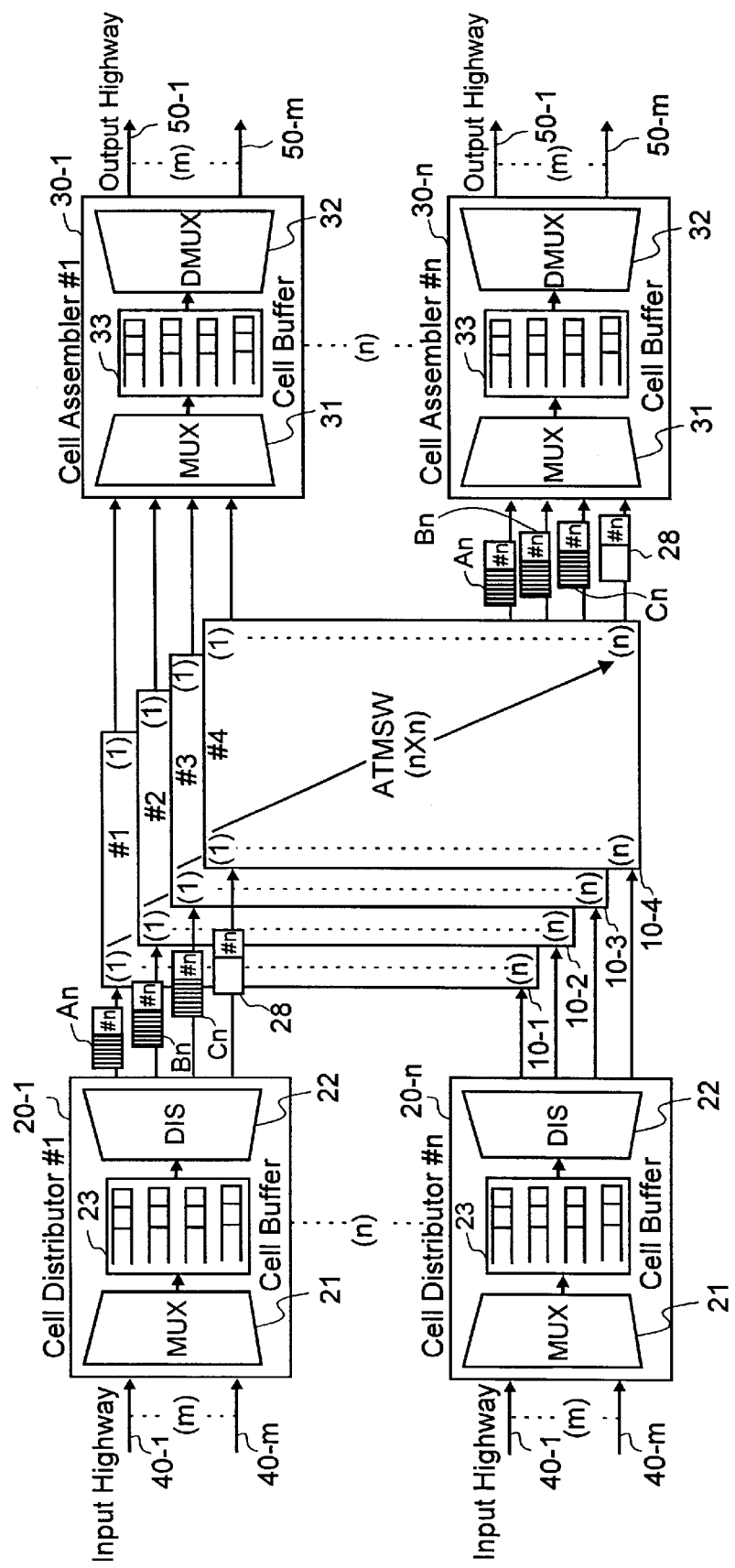
FIG. 8 is a diagram illustrating another structure and operation of the ATM switch.

A connection among cell distributor 20, ATM switch units 10-1~10-4, and cell assemblers 30, which are arranged in the ATM switch 10 of the present invention is explained as follows. In addition, an operation of the ATM switch is also explained. FIG. 7 is an exemplary diagram that illustrates the structure and operation of the ATM switch 10 of the present invention. FIG. 8 is an exemplary diagram that illustrates another operation of the ATM switch 10. The cell distributor 20 illustrated in FIG. 7 and FIG. 8 is the same as that described with respect to the cell distributor 20 illustrated in FIG. 4.

An exchange operation of the cell received from the cell distributor will be described using FIG. 7. Four cells are output in a parallel by the same timing from the cell distributor 20 and are given routing information that indicate the same destination in each of the headers. The destination is indicated by the upper bits of the output port identifier, RTGU area 83-1 illustrated in FIG. 6. In this example, #1 is indicated as the output port. Therefore, each ATM switch unit 10-1~10-4 exchanges the received cell to output port 1 based on the routing information represented by RTGU area 83-1 having #1.

Another exchange operation of the cell received from the cell distributor 20 is explained by using FIG. 8. Four cells, including a dummy cell 28, are output in parallel by the same timing from the cell distributor 20 and are given routing information that indicates the same destination in each of the headers. The destination is indicated by the upper bits of the output port identifier, RTGU area 83-1, illustrated in FIG. 6. In this example, #N is indicated as the output port. Therefore, each ATM switch unit 10-1~10-4 exchanges the received cell to output port N based on the routing information represented by RTGU area 83-1 having #N.

Each of the cell distributors 20-1~20-N distributes cells with same routing information to each of the four ATM switch units 10-1~10-4 in the ATM switch 10 of the present invention. That is, each of the cell distributors 20-1~20-N distributes cells so that each of the four ATM switch units 10-1~10-4 exchanges the received cell based on the same routing information in parallel. Thus, the routing operation of all ATM switch units 10-1~10-4 are the same. Therefore, as for a cell input into the same port of each ATM switch unit the output port and the timing thereof is the same. Accordingly, complex routing control between ATM switch units is not necessary due to the above described structure. Such a structure can operate in the above described manner by only supplying clock and frame signals for synchronization from the same source.

The ATM switch units of the present invention, can be any one of known ATM switches such as a shared buffer type switch disclosed in Japanese Laid-open Publication 2-1669, corresponding to U.S. Reissued Patent No. Re. 34,305, an output buffer type switch disclosed in Japanese patent Laid-open Publication 5-145574, a cross-point switch disclosed in Japanese patent Laid-open Publication 1-204548.

In the present invention, since an ATM switch unit in which internal traffic blocking does occur is used, cells are uniformly distributed to each ATM switch unit. Therefore, internal traffic blocking does not occur in an ATM switch which has been expanded according to the present invention.

Figure 9:
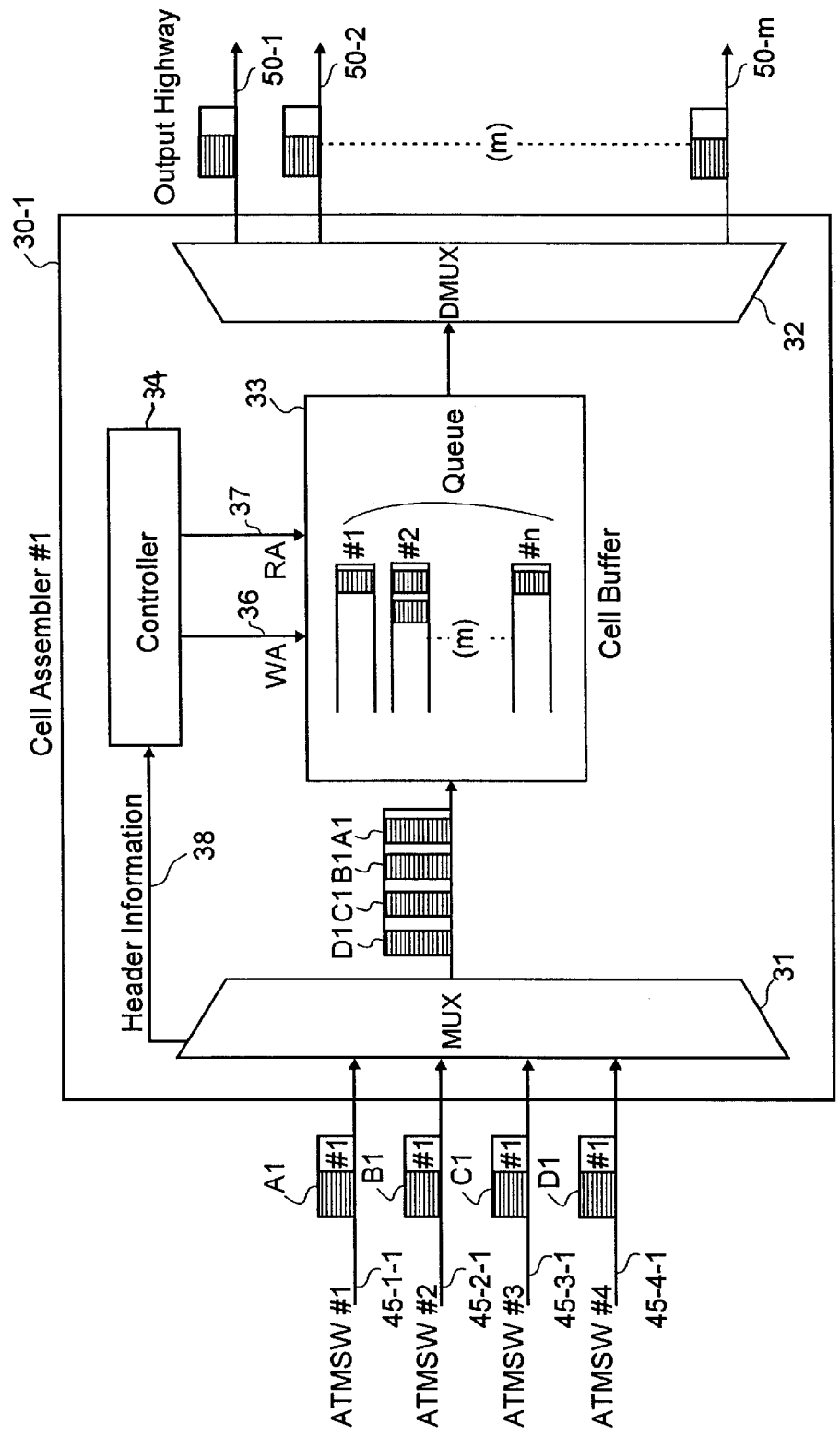
FIG. 9 is a block diagram illustrating the structure and operation of a cell assembler of an ATM switch of the present invention.

A structure of a cell assembler 30 arranged in the ATM switch 10 of the present invention and an operation thereof is explained as follows. FIG. 9 is a block diagram that illustrates the structure and operation of a cell assembler of the ATM switch of the present invention. The structure and an operation of the cell assembler 30 are explained, in the case where cells A1, B1, C1 and D1 of the same destination are received in parallel from ATM switch units 10-1~10-4, for example. The cell assembler 30 includes a cell multiplexer (MUX) 31, a cell demultiplexer (DMX) 32, a cell buffer 33 and a control unit 34. The cell assembler 30 operates as follows:

(1) The cell multiplexer (MUX) 31 multiplexes received cells to preserve the cell order of the cell sequence (A1, B1, C1 and D1) as input to the cell distributor (DIS) 22 of a cell distributor 20. That is, the cell multiplexer 31 multiplexes cells to return each cell distributed in parallel by the cell distributor 20 to their former time sequentially order. In the example of FIG. 9, the cell multiplexer 31 multiplexes cells to output it in the time sequential order of A1, B1, C1 and D1.;

(2) A header information 38 is extracted from each of the received cells and is input into control unit 34;

(3) The control unit 34 outputs a write address WA 36 according to the lower bits of the output port identifier, namely RTGD area 83-2 included in the header information 38, and stores the cell in the cell buffer 33. Queuing buffers corresponding to each of the output highways are set in the cell buffer 33, and the cell is stored in one of the queuing buffers. The control unit 34 also outputs a read address RA 37 and reads a cell from cell buffer 33 (one of the queuing buffers); and (4) The cell demultiplexer (DMUX) 32 distributes cells read from the cell buffer 33 to one of the output highways and outputs a cell through the output highway 50.

Figure 10:
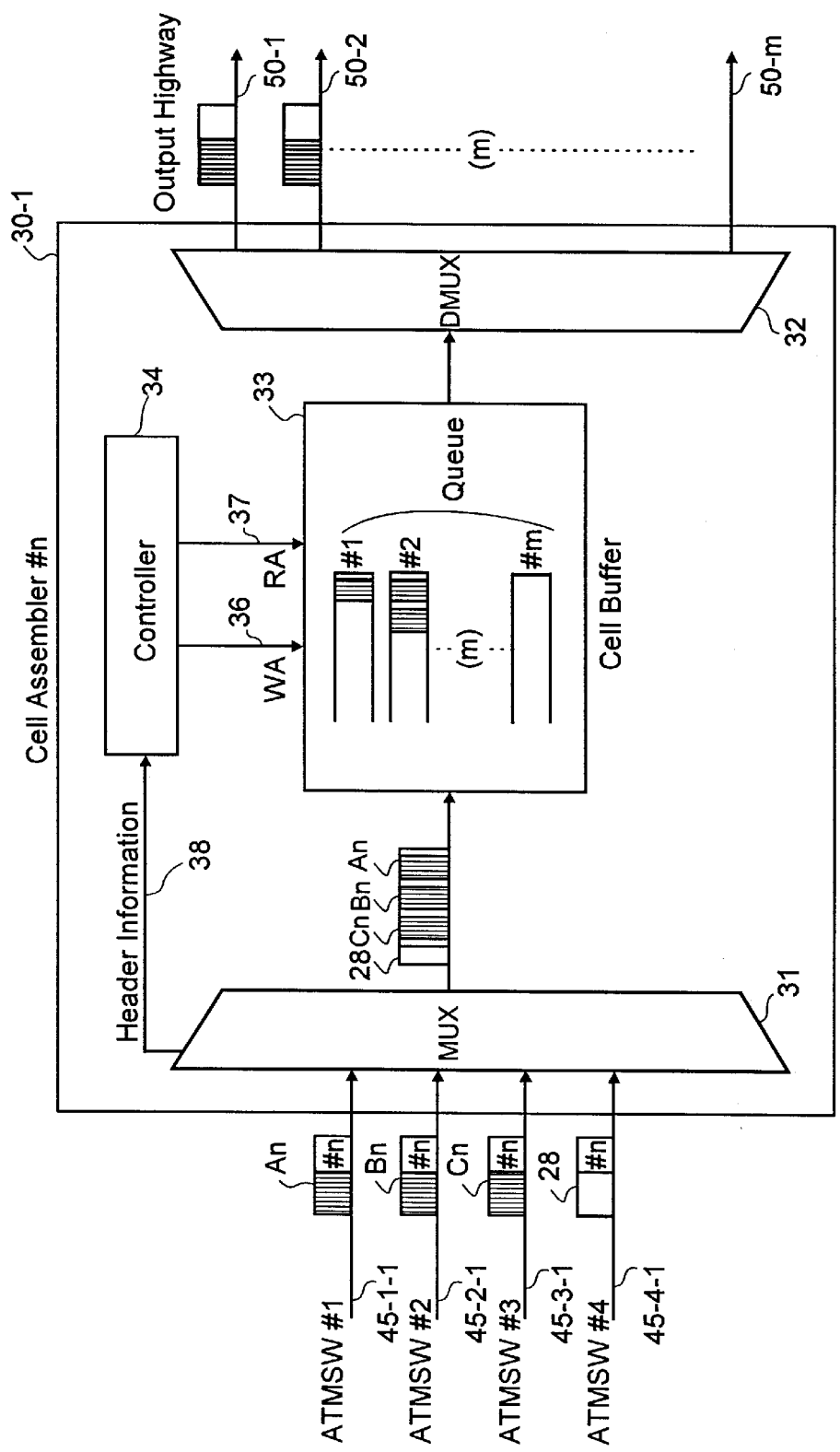
FIG. 10 is a diagram illustrating another structure and operation of the cell assembler.

FIG. 10 is an exemplary diagram that illustrates another operation of the cell assembler 30. An operation when a dummy cell 28 is input into the cell assembler 30 is as follows. When a dummy cell 28 is input into cell assembler 30, the control unit 34 detects the dummy cell 28 from the header information and discards the dummy cell without writing it to the cell buffer 33. The dummy cell is detected by the D area (bit) 85 which indicates whether the cell is a dummy cell.

According to the ATM switch of the present invention, in a large scale ATM switch an increase in capacity is proportional to the number of ATM switch units required to accomplish the increase. Therefore, the ATM switch of the present invention can be easily expanded by the following method:

(1) The cell distributor 20 and the cell assembler 30 are composed in advance to the maximum ATM switching capacity that is contemplated in the future; and (2) The value stored in the distributive number register 244 of the cell assembler 20 and the number of ATM switch units are gradationally increased in proportion to the expansion of switching capacity.

The corresponding linearity of the hardware elements necessary to accomplish the increases in ATM switching capacity is enabled by use of the above described expansion method of the present invention. It is possible in the present invention to further enlarge a switching capacity of an ATM switch by the following structure and a method:

(1) An ATM switch having its capacity expanded by the structure or method shown in the above example is made a new ATM switch unit; and (2) Such new ATM switch units are installed in parallel with each other, and new cell distributors and new cell assemblers are arranged with respect to the parallely arranged new ATM switch units based on the structure and method shown in above example.

Figure 11:
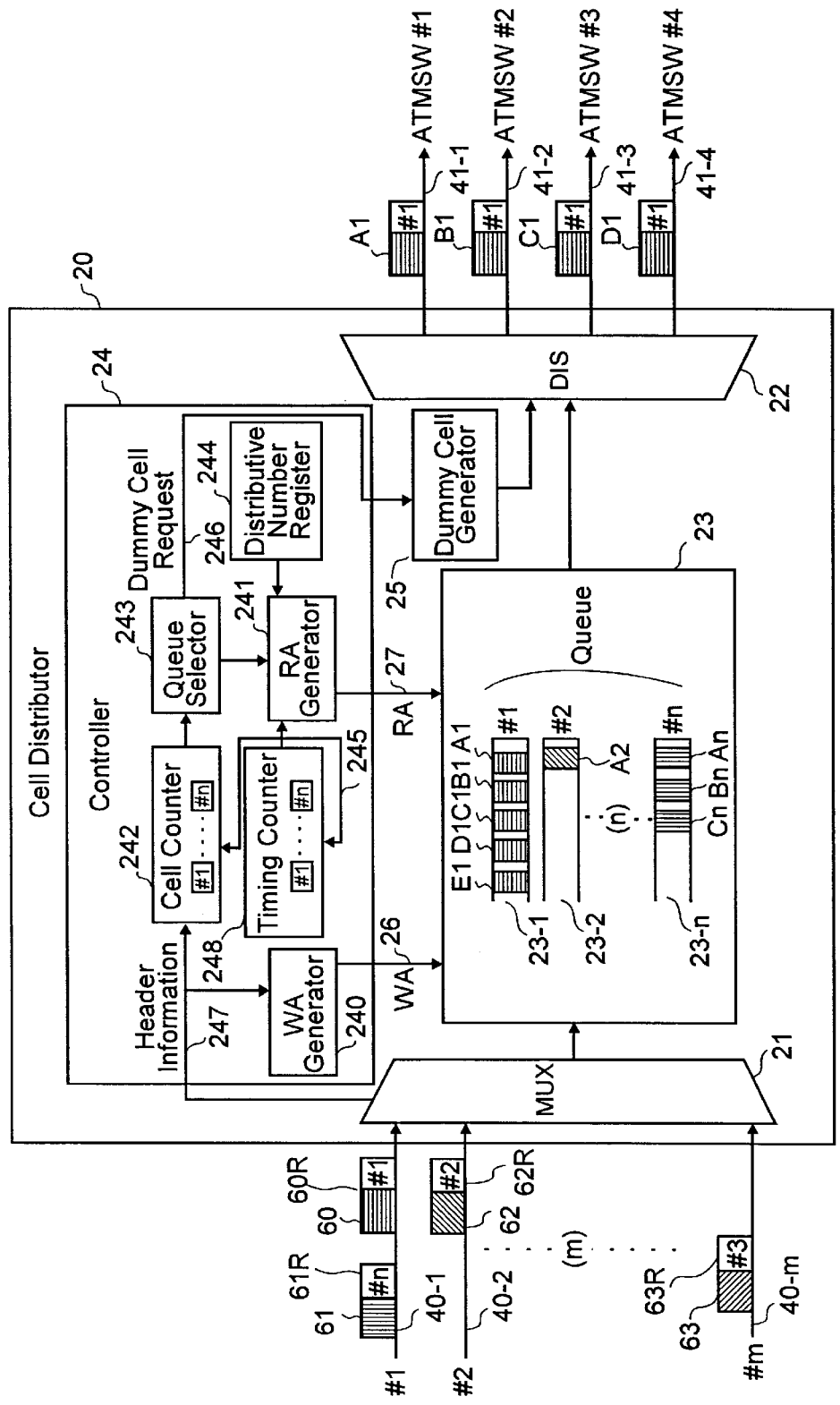
FIG. 11 is a block diagram illustrating the structure and operation of another cell distributor.

FIG. 11 is a block diagram that illustrates the structure and operation of another cell distributor 20 of an ATM switch of the present invention. In the cell distributor 20 shown in FIG. 4, the selection of a queuing buffer is performed by the queue selector 243 based on a maximum value of the cell counter 242. However, in this structure, a cell is a seldom accumulated in a queuing buffer corresponding to an output port with a low traffic rate. Thus, the frequency of a cell read with respect to the low traffic rate queuing buffer is low, and cell transmission delay increases. Therefore, the cell distributor 20 illustrated in FIG. 11, further includes timing counters 248 corresponding to the output ports of the ATM switch units (#1–#N). The timing counters 248 are counted up by a constant timing.

The queue selector 243 selects one of the queuing buffers by using a value corresponding to the addition of the value of the cell counter 242 and the value of a timing counter 248. The timing counter 248 corresponding to the queuing buffer selected by the queue selector is then reset. Thus, if the cell distributor 20 illustrated in FIG. 11 is used, quality degradation influenced by cell transmission delay in cell distributor 20 can be prevented. This structure is suitable for cell traffic that is sensitive to delays such as image signals, audio signals, etc.

Another structure for the cell distributor 20 to prevent such delays would be a structure that selects one of the queuing buffers 23-1~23-N in a round robbin manner without using the value of the cell counter 242 and the timing counters 248.

Figure 2:
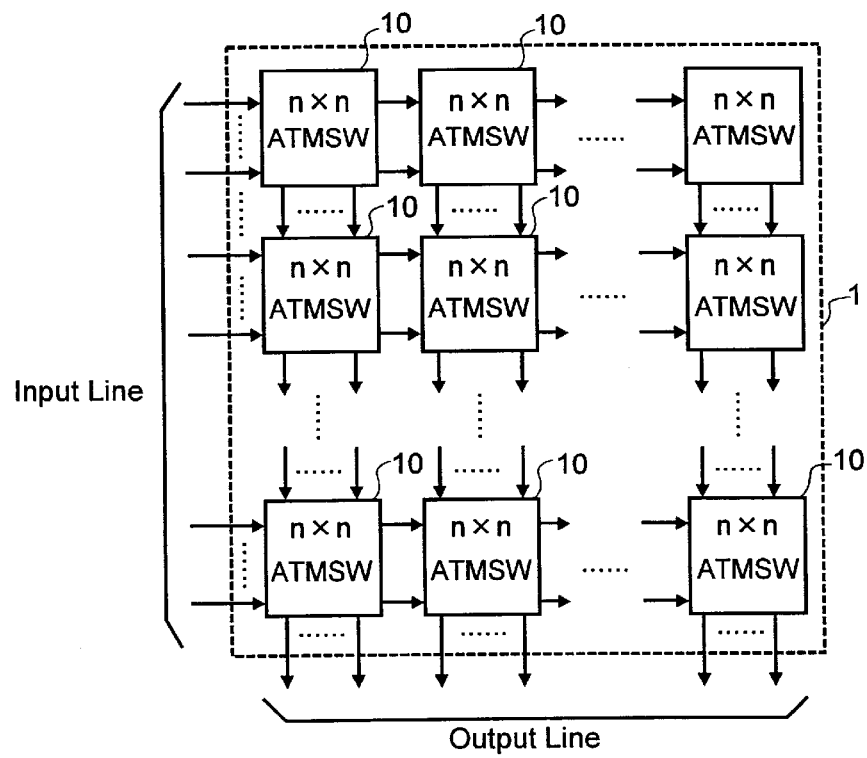
FIG. 2 is a block diagram illustrating the structure of a conventional large scale ATM switch.
Figure 3:
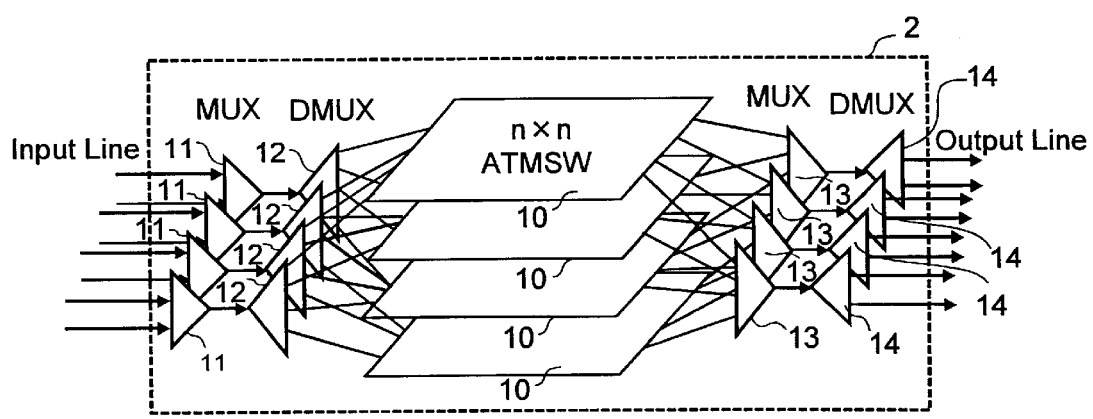
FIG. 3 is a block diagram illustrating the structure of a conventional ATM switch.
Figure 12:
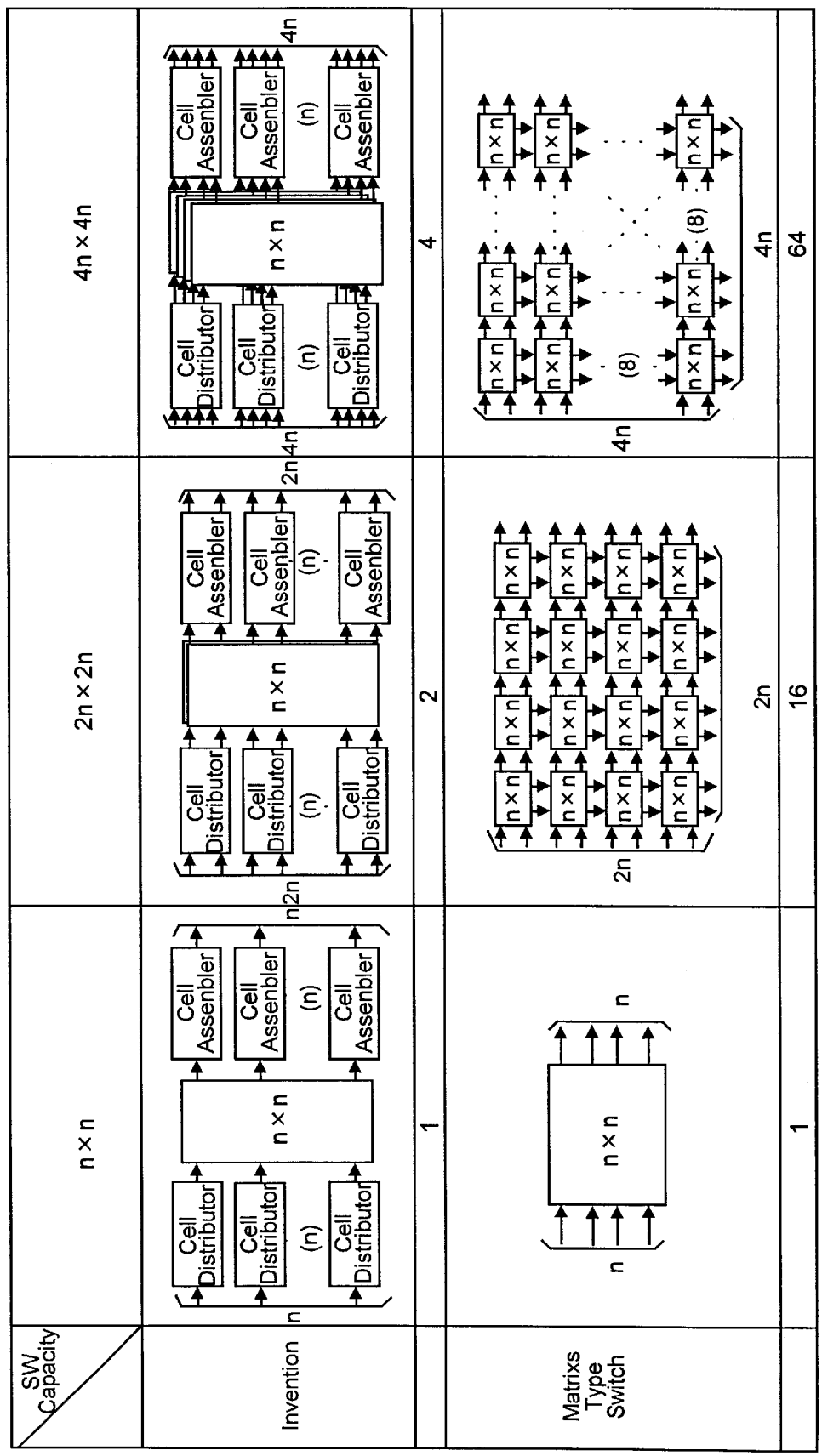
FIG. 12 is a chart, that graphically illustrates the amount of hardware necessary for an increase in the capacity of the ATM switch of the present invention.

FIG. 12 is an explanation diagram for graphically illustrating the amount of hardware increases that necessary to implement a desired increase in capacity of the ATM switch according to the present invention. In the same diagram, an expansion of a switch by a matrix connection method shown in FIG. 2 also is explained and the difference is explained.

When an ATM switch unit of N×N is used and expansion is performed, the ATM switch of the present invention having double the capacity of 2 N×2N is provided by arranging 2 ATM switch units in a parallel, and the ATM switch having quadruple the capacity of 4 N×4N is provided by arranging 4 ATM switch units in parallel. According to the ATM switch of the present invention, the required number of ATM switch units to accomplish an increase in capacity of the ATM switch becomes a proportional relation making it possible to expand the ATM switch linearly.

In the conventional matrix connection method 16 ATM switch units are necessary for constructing an ATM switch that has double the capacity of 2 N×2N, and 64 ATM switch units are necessary for constructing an ATM switch that has quadruple the capacity of 4 N×4N. Thus, in conventional apparatus an increasingly larger number of ATM switch units are necessary to accomplish each unit amount of increased capacity. Therefore, according to the present invention, it is possible to expand an ATM switch in a simple procedure with fewer amounts of additional hardware for each unit amount of increase capacity. Further, according to the present invention it is possible to provide an ATM switch where internal blocking of traffic does not occur even when the ATM switch has been expanded.

According to the ATM switch of the present invention, when a large scale ATM switch is constructed by using plural ATM switch units that have a certain switching capacity, the ATM switch is not required to take on huge amounts of redundant hardware as in conventional apparatus. The present invention provides a large scale ATM switch that can have its capacity increased using minimal added hardware amounts. In other words, the present invention allows for the expansion of an ATM switch in a linear manner where the amount of hardware increase is proportional to the desired increase in capacity.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. An ATM switch which transfers each of a plurality of ATM cells received from a plurality of incoming highways to one of a plurality of outgoing highways based on destination information included in a header of said ATM cell, comprising:

a plurality of ATM switch units, each ATM switch unit transfers an ATM cell received from one of a plurality of input lines to one of a plurality of output lines based on destination information included in a header of said ATM cell;

a plurality of cell distributors, each cell distributor distributes a plurality of ATM cells, each of said ATM cells having the same destination information, said ATM cells including at least one of ATM cells received from the input highways and dummy cells, each cell distributor distributes said ATM cells to one of the input lines of each of said ATM switch units; and a plurality of cell assemblers, each cell assembler assembles said ATM cells received from said ATM switch units and transfers each of the assembled ATM cells except dummy cells to one of the output highways based on destination information included in a header of the ATM cell, wherein a sum of a number of ATM cells read from a buffer memory included in each cell distributor and a number of dummy cells is equal to the number of said ATM switch units and said ATM cells output to one of the input lines of said ATM switch units by said cell distributor have the same destination information.

2. An ATM switch which transfers each of a plurality of ATM cells received from a plurality of incoming highways to one of a plurality of outgoing highways based on destination information included in a header of said ATM cell, comprising:

a plurality of ATM switch units, each ATM switch unit transfers an ATM cell received from one of a plurality of input lines to one of a plurality of output lines based on destination information included in a header of said ATM cell;

a plurality of cell distributors, each cell distributor comprises:

a first buffer memory which stores said ATM cells received from said input highways, a dummy cell generator which generates a dummy cell, a first control unit which controls write and read operations of said first buffer memory and operations of said dummy cell generator, and a cell distributor which distributes said ATM cells read from said first buffer memory and said dummy cell to said input lines of said ATM switch units; and a plurality of cell assemblers, each cell assembler comprises:

a second buffer memory which stores said ATM cells received from said ATM switch units except the dummy cell, a demultiplexer which distributes each of said ATM cells read from said second buffer memory to one of the output highways, and a second control unit which controls write and read operations of said second buffer memory, wherein said cell distributor further comprises:

a timing counter which is counted up by a predetermined timing, wherein said selector selects one of the output lines of each of said ATM switch units based on an output of said counter and said timing counter, and wherein said cell distributor further comprises:

a timing counter which is counted up by a predetermined timing, wherein said selector selects one of the output lines of each of said ATM switch units based on an output of said counter and said timing counter.

* * * * *